United States Patent [19]

Baggenstoss

[11] Patent Number: 5,045,712
[45] Date of Patent: Sep. 3, 1991

[54] SYNCHRONIZED SWITCHED MODE POWER SUPPLIES

[75] Inventor: Paul M. Baggenstoss, Middletown, R.I.

[73] Assignee: Raytheon Company, Lexington, Mass.

[21] Appl. No.: 874,800

[22] Filed: Jun. 13, 1986

Related U.S. Application Data

[63] Continuation of Ser. No. 717,469, Mar. 28, 1985, abandoned, which is a continuation of Ser. No. 408,969, Aug. 17, 1982, abandoned.

[51] Int. Cl.⁵ .............................................. H02M 7/00
[52] U.S. Cl. ......................................... 307/29; 307/32; 307/41; 363/26; 363/41
[58] Field of Search .................... 307/18, 29, 32, 41, 307/55, 127; 323/217, 300, 311, 312; 363/26, 36, 37, 41

[56] References Cited

U.S. PATENT DOCUMENTS

| | | | |
|---|---|---|---|
| 4,016,474 | 4/1977 | Mason | 307/41 X |
| 4,034,232 | 7/1977 | La Venture | 307/32 |
| 4,163,906 | 8/1979 | Shimamura | 307/41 X |
| 4,339,697 | 7/1982 | Franz | 363/41 |
| 4,344,124 | 8/1982 | Panicali | 363/26 |
| 4,521,745 | 6/1989 | Falconer | 331/2 |

Primary Examiner—Todd E. Deboer
Attorney, Agent, or Firm—Richard M. Sharkansky; Denis G. Maloney

[57] ABSTRACT

This invention reduces the ripple component of current in the alternating current to, or direct current from, a common power source providing direct current power to a plurality of switched dc/dc power supplies by controlling the time of occurrence of switching of each of the supplies. Each dc/dc power supply is controlled by a switch pulse from a switching circuit which determines the occurrence and duration of time during which each power supply is switched "on". The time of occurence of the switch pulse of each switching circuit is determined by the application of an individual synchronizing pulse to each switching circuit. The combined effect of the ripple components of currents provided to the switched power supplies is minimized by summing these currents with appropriately phased synchronizing pulses applied to the switching circuits.

3 Claims, 3 Drawing Sheets

SYNCHRONIZED SWITCHED MODE POWER SUPPLIES

This application is a continuation of application Ser. No. 717,469, filed Mar. 28, 1985 now abandoned, which is a continuation of application Ser. No. 408,969, filed 8/17/82, now abandoned.

BACKGROUND OF THE INVENTION

This invention relates to a circuit for the reduction of ripple and intermodulation products on a common a.c. or d.c. supply line by the synchronization of switched mode power supplies. Switched power supplies are commonly used in electronic equipment and can result in serious interference problems being produced on the electric lines providing power to the equipment. Electromagnetic interference filters are used to reduce the generated interference to acceptable levels as determined by Government regulations or the sensitivity of other equipment proximate to the generated interference. Reduction of the ripple current in the power lines by this invention reduces the demands placed upon the interference filters and results in a cost effective technique for interference reduction.

SUMMARY OF THE INVENTION

This invention reduces the ripple component of current in the alternating current to, or direct current from, a common power source providing direct current power to a plurality of switched dc/dc power supplies by controlling the time of occurrence of switching of each of the supplies. Each dc/dc power supply is controlled by a switch pulse from a switching circuit which determines the occurrence and duration of time during which each power supply is switched "on". The time of occurrence of the switch pulse of each switching circuit is determined by the application of an individual synchronizing pulse to each switching circuit. The combined effect of the ripple components of currents provided to the switched power supplies is minimized by summing these currents with appropriately phased synchronizing pulses applied to the switching circuits.

BRIEF DESCRIPTION OF THE DRAWINGS

The foregoing features of the invention, as well as the invention itself, may be more fully understood from the following detailed description read together with the accompanying drawings, in which.

DESCRIPTION OF THE PREFERRED EMBODIMENT

Figure 1:
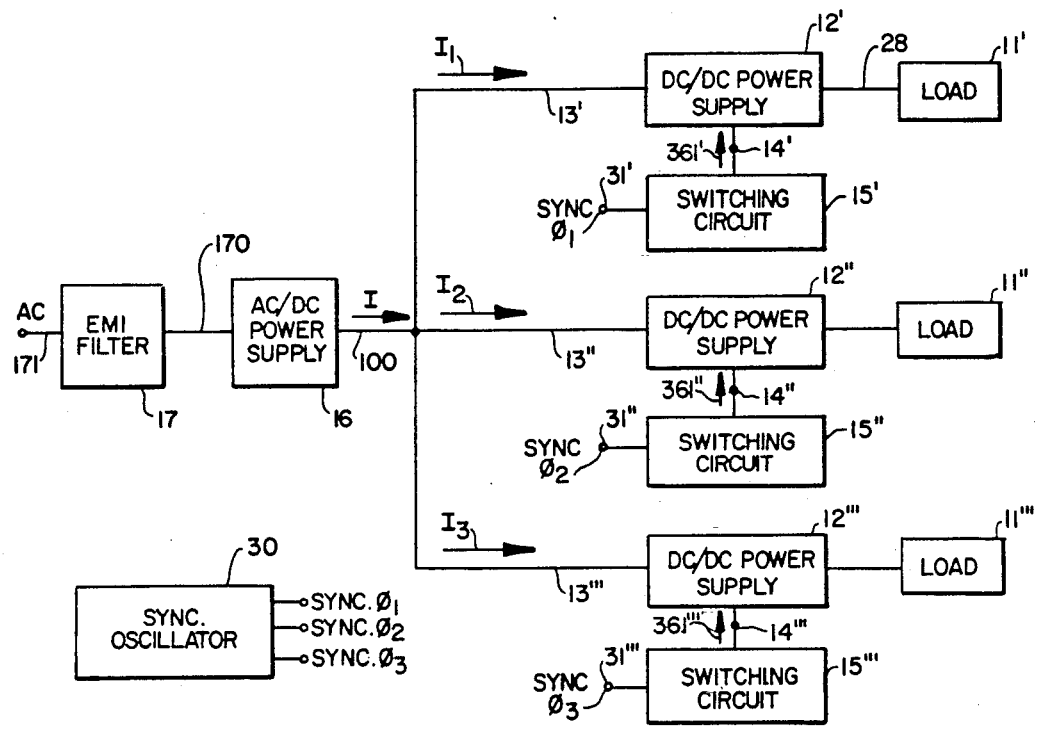
FIG. 1 is a block diagram of a preferred embodiment of the invention.

A block diagram of a preferred embodiment of the invention is shown in FIG. 1. A plurality of direct current electrical loads 11 are each connected to its direct current to direct current (dc/dc) switched power supply 12 which provides a direct current voltage and current to the load 11 which may be substantially different from the voltage and current at the input terminal 13 of power supply 12. The output voltage and current of each power supply 12 to its particular load 11 is controlled by the width of the control pulse $V_{14}$ applied to control terminal 14 of supply 12. The control pulse $V_{14}$ is provided by switching circuit 15 in response to a synchronizing voltage, SYNC $\phi$, applied to switching circuit 15 input 31. Each synchronizing voltage has the same frequency and a phase $\phi$ controllable by control 18 with respect to the other synchronizing voltages and each is provided by a common sync oscillator 30. The input current of each supply 12 is provided by connecting each supply 12 to a common ac/dc power supply 16 direct current output and whose alternating current input is filtered by an electromagnetic interference filter 17.

Figure 2:
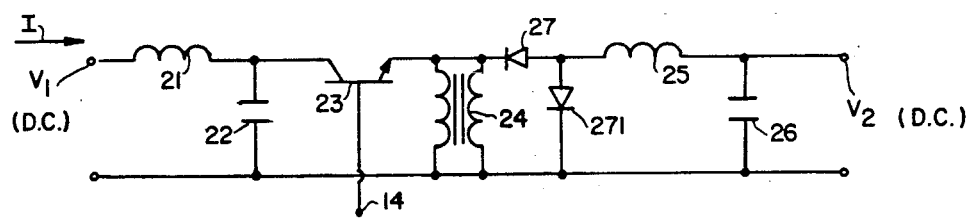
FIG. 2 is an electrical schematic of a switched dc/dc power supply.

A typical dc/dc supply 12 is shown in FIG. 2. A direct current input voltage $V_1$ and current $I_1$ are provided through a filter comprising an inductor 21 and capacitor 22 to the collector of power transistor 23. The control pulse $V_{14}$ at terminal 14 is applied to the base of transistor 23. Where the output voltage $V_2$ is reduced substantially from voltage $V_1$, a step-down voltage transformer 24 is connected to the emitter of transistor 23. A second filter comprised of inductor 25 and capacitor 26 is connected across the low voltage side of transformer 24. Diodes 27 and 271 switch inductor 25 alternately to ground and to transformer 24 and thereby perform rectification of the waveform at the secondary of transformer 24. Typically, a dc/dc power supply 12 will have an input voltage $V_1$ of 160 volts d.c. and provide an output voltage $V_2$ at 5v and 150A.

Figure 3:
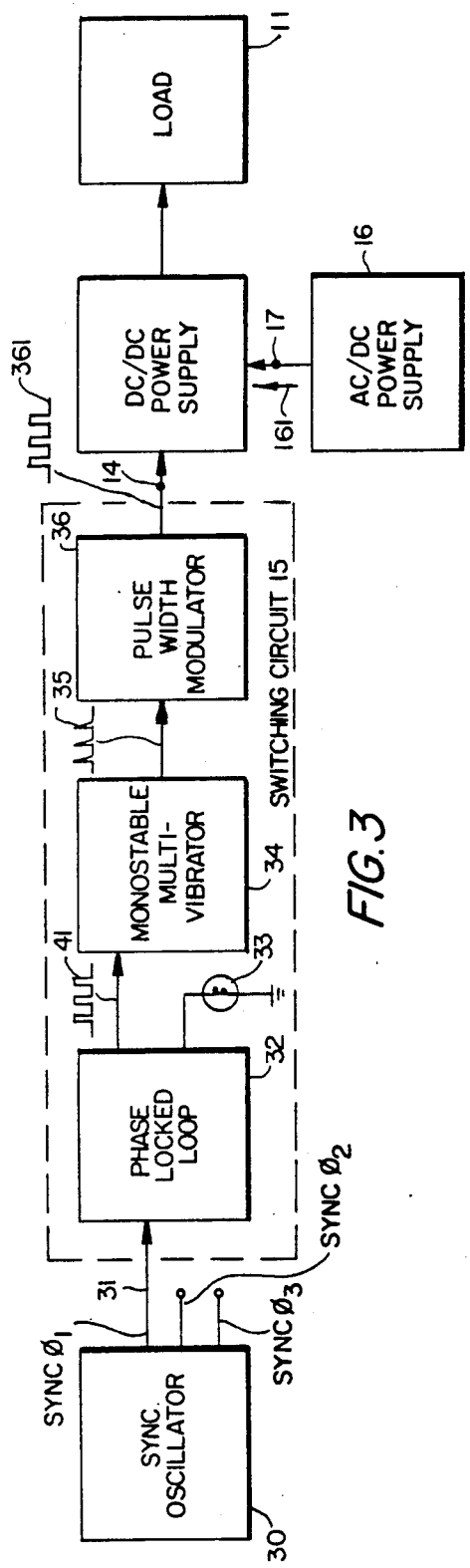
FIG. 3 is a block diagram of a portion of a preferred embodiment of the invention.
Figure 4:
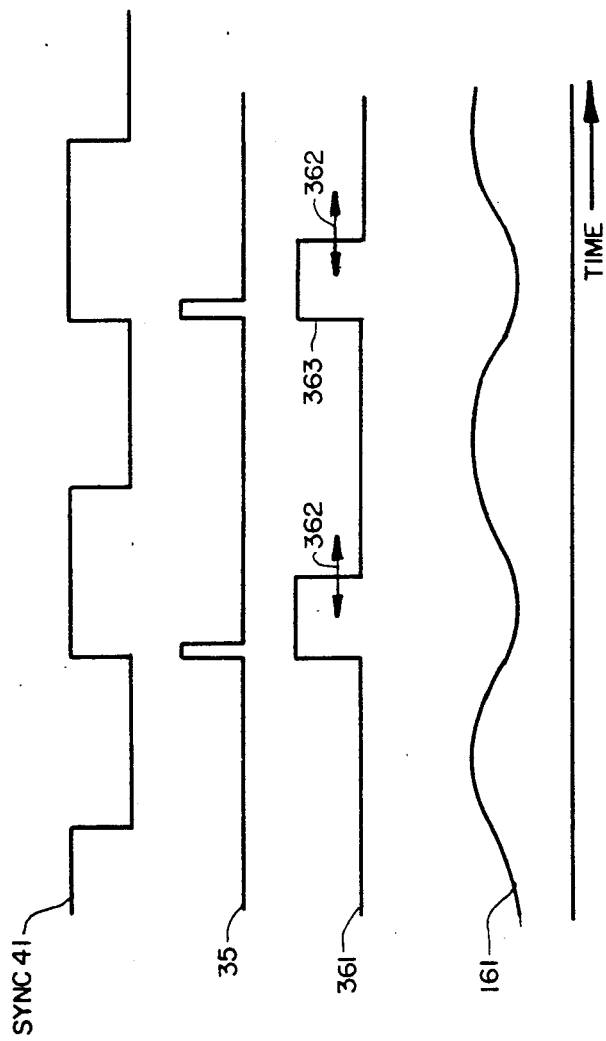
FIG. 4 shows the waveforms of the voltage and current in the block diagram of FIG. 3.

The switching circuit 15 block diagram is shown in FIG. 3. A synchronizing signal such as waveform 41 of FIG. 4 is provided from an oscillator 30 to the input terminal 31 of switching circuit 15. The frequency of the synchronizing signal 41 at terminal 31 is typically 200 KHz. The free running frequency of the phase-locked loop circuit 32 is controlled by conventional means to cause circuit 32 to readily lock onto the frequency of the synchronizing signal. Synchronization or "lock-on" of the phase-locked loop is visually indicated by a lamp 33. A Signetics type NE 567 phase-locked loop has been used in a preferred embodiment, and its free running frequency is controlled by a variable resistor connected between its terminals 5 and 6. The output of phase locked loop 32 is connected to the input of a conventional TTL monostable multivibrator 34, for example a type 74LS221 multivibrator, which converts the square wave (or sinusoidal have) of the output of the loop 32 into a train of output trigger pulses 35 of the same frequency as that provided by phase-locked loop 32 and having a fixed phase relationship with the synchronizing waveform 41.

The output pulses 35 of monostable multivibrator 34 are provided as an input to the pulse width modulator 36. The width of the output pulses 361 at terminal 14 of pulse modulator 36 is controlled by a d.c.. width control voltage provided by voltage source 38 on terminal 37 of the modulator 36. The width of the output pulses 361 of modulator 36 controls the voltage and current provided by the dc/dc power supply 12 to the load 11. The direction arrow 362 indicates that width of pulses 361 is changed by changing the lagging edge of the pulse thereby not changing the phase relationship of the leading edge 363 with respect to trigger pulse 35. This preservation of phase is not necessary however. Modulator 36 in the preferred embodiment was a Silicon General type SG 1524 connected to the Q output of the 74LS221 multivibrator. A typical waveform for the current 161 provided by the ac/dc power supply 16 to the dc/dc power supply 12 is the waveform 161 of FIG. 4 which is the filtered form of the rectangular pulsed current provided by transistor 23 in response to the rectangular control pulse waveform 361.

Figure 5:
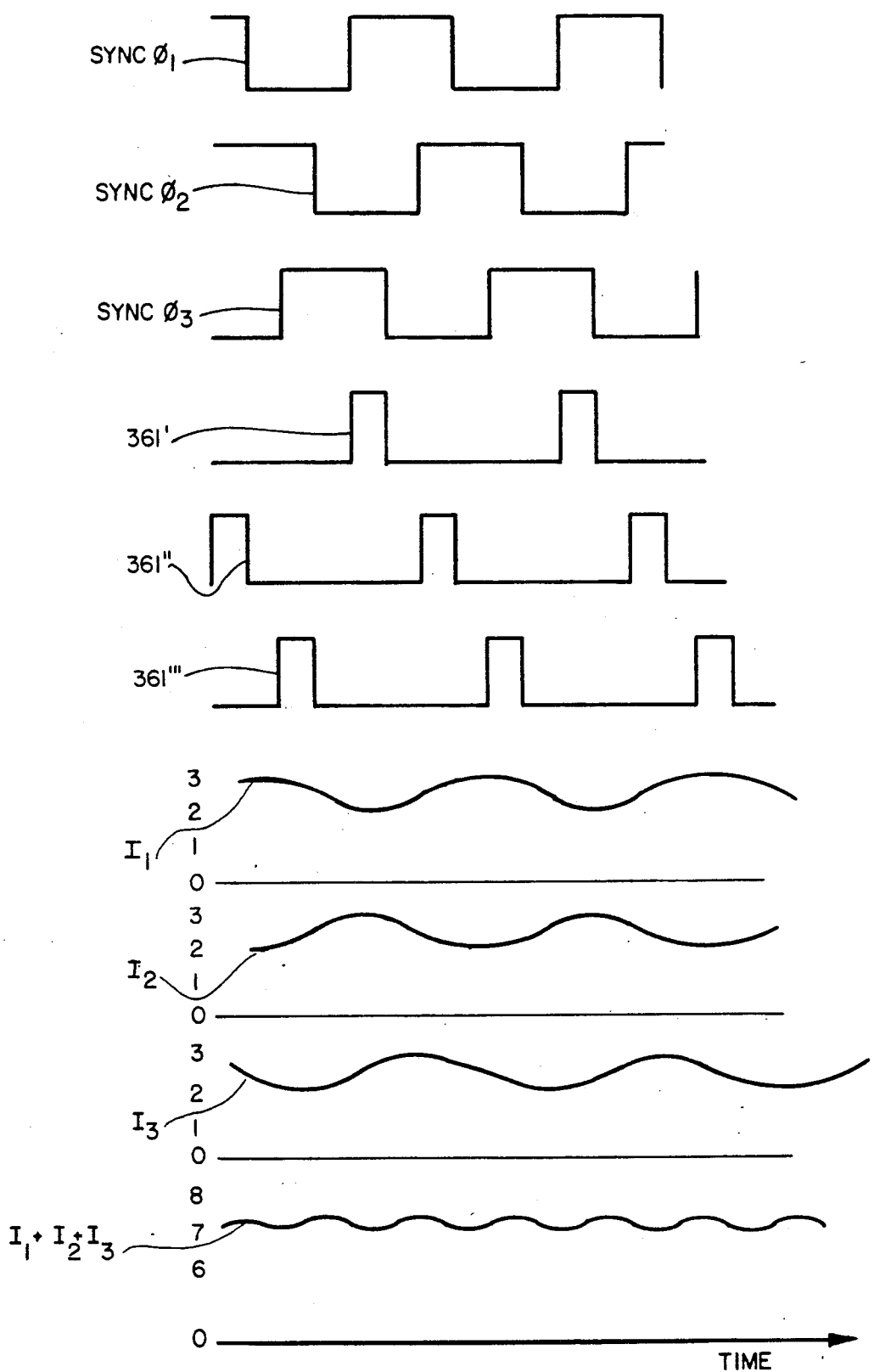
FIG. 5 shows the waveforms of the voltage and current in the block diagram of FIG. 1.

Referring now to FIGS. 1 and 5, there are shown three dc/dc power supplies 12', 12'', 12''' connected to a common ac/dc power supply 16 and to their respective loads 11', 11'', 11'''. For the purpose of more clearly illustrating the invention, it will be assumed that the voltage and current of each load 11 is equal. Each power supply 12', 12'', 12''' is connected to its respective switching circuit 15', 15'', 15''' which provides respective control pulses 361', 361'', 361'''. Thus, each power supply 12 is switched by its respective switching circuit 15 and provides power to its respective load 11. The direct currents $I_1$, $I_2$, and $I_3$ being provided to the respective dc/dc power supplies 15', 15'' and 15''' have the waveshape 161 such as shown in FIG. 4.

The synchronizing oscillator 30 provides three synchronizing square waves 41, SYNC $\phi_1$, SYNC $\phi_2$, and SYNC $\phi_3$, which are 120° out of phase with each other to the switching circuits 15', 15'' and 15''', respectively.

Since each current $I_1$, $I_2$ and $I_3$ has a prescribed phase relationship with its synchronizing waveform SYNC $\phi_1$, SYNC $\phi_2$ and SYNC $\phi_3$, respectively, these currents will also be 120° out of phase with each other as shown in FIG. 5. The ac/dc power supply 16 provides on its output line 100 the sum I by the addition of the currents $I_1$, $I_2$, $I_3$ shown in FIG. 5. The fundamental frequency components of $I_1$, $I_2$, $I_3$ completely cancel in the sum $I_1$, $I_2$ and $I_3$ due to the phase relationships. The sum current $I_1+I_2+I_3$ will therefore produce much less ripple and electromagnetic interference from output line 100 of ac/dc power supply 16. The electromagnetic interference filter 17 in the a.c. input line of power supply 16 and the filtering provided within the d.c. power supply 16 will be much more effective in filtering the effects of the reduced ripple sum current $I_1+I_2+I_3$ than in filtering the individual currents.

It will be apparent that in the event the load is not a three phase balanced direct current load as in the example of a preferred embodiment, the circuit of the invention can nonetheless reduce ripple currents by summing the input direct currents 161 of the dc/dc supplies 12 with a corresponding reduction of interference effects in the alternating current source lines 170, 171. For example, if there are only two loads 11' and 11'' equal in load current, their sum will have a ripple approximately between zero and one-half of the individual load currents depending upon the symmetry of the waveform of each load current when the synchronizing waveform 41 has SYNC $\phi_1$ 180° out of phase with SYNC $\phi_2$ provided by sync oscillator 30.

It is further apparent that the loads 11 may have unequal currents or the ripple of the input currents of the dc/dc supplies 12 are not triangular as assumed in this explanation of the invention, nonetheless substantial decrease in the ripple component of the sum current provided by supply 16 on line 150 is obtained when the synchronizing waveforms 41 provided by sync oscillator 30 are controllably phased to minimize the ripple current in the sum of the currents $I_1+I_2+... I_n$, where n may be any integer, and $I_n$ is the current resulting from the nth load $11_n$.

Having described a preferred embodiment of the invention, it will now be apparent to one of skill in the art that other embodiments incorporating its concept may be used. It is felt, therefore, that this invention should not be restricted to the disclosed embodiment but rather should be limited only by the spirit and scope of the appended claims.

What is claimed is:

1. An electrical circuit used in reducing ripple of the output current of an ac/dc power supply comprising:

an ac/dc power supply;

a plurality of dc/dc switched power supplies having their inputs connected to the dc output of said ac/dc power supply;

the dc output having a ripple component of current which is the sum of the ripple components of the input currents of said dc/dc power supplies;

switching means connected to each of said dc/dc power supplies providing a plurality of control pulses for repetitively switching each dc/dc power supply to a conductive state for a controllably predetermined time duration and at a controllably predetermined phase with respect to each other thereby reducing said ripple component of ac/dc supply output current by addition of the input ripple currents of each dc/dc/ power supply;

a plurality of electrical loads, each of said loads being connected to the output of a different one of said dc/dc power supplies.

2. The circuit of claim 1, wherein said switching means comprises:

a synchronizing means for providing a predetermined controllable different time of occurrence of each of said control pulses; and means for controlling the time duration of each of said control pulses.

3. The circuit of claim 1 wherein each switching means comprises:

a means providing synchronozing signals;

a phase locked loop having its input connected to said synchronizing signals providing means;

a monostable multivibrator connected to and triggered by the output of said phase locked loop; and a pulse width modulator connected to and triggered by the output of said monostable multivibrator to provide a control pulse to said dc/dc power supply.

* * * * *